A. L. PUTNAM.
VEHICLE WHEEL AND AXLE.
APPLICATION FILED JUNE 27, 1919.
1,406,759.
Patented Feb. 14, 1922.
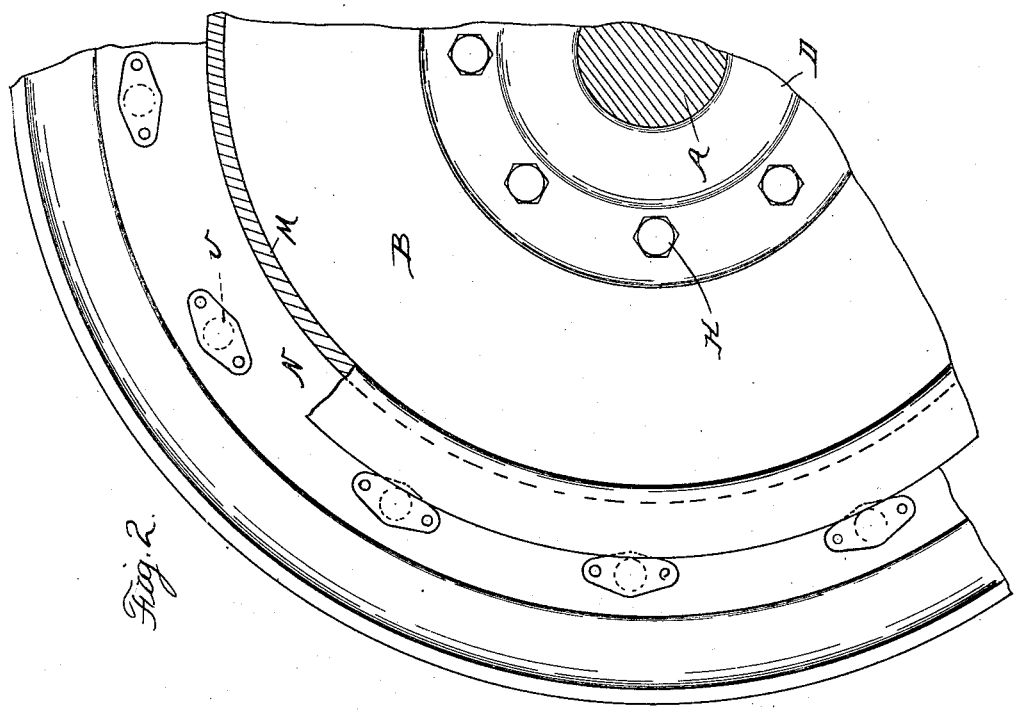
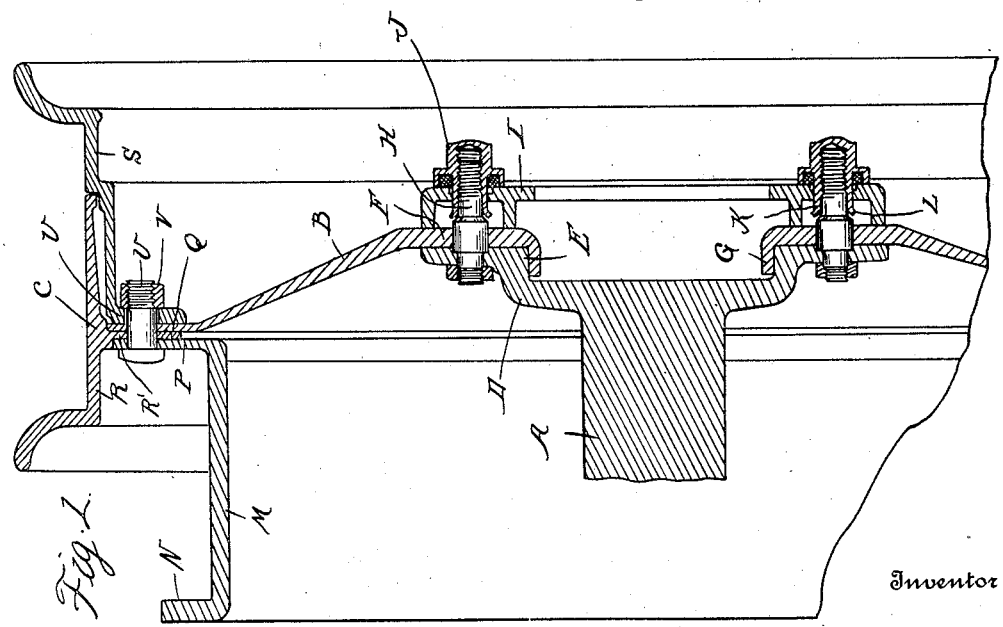
Inventor
Alden L. Putnam
By Whittemore Hulbert & Whittemore
Attorneys

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

VEHICLE WHEEL AND AXLE.

1,406,759. Specification of Letters Patent. Patented Feb. 14, 1922.

Application filed June 27, 1919. Serial No. 307,140.

*To all whom it may concern:*

Be it known that I, ALDEN L. PUTNAM, a citizen of the United States of America, residing at Detroit, in the county of Wayne and State of Michigan, have invented certain new and useful Improvements in Vehicle Wheels and Axles, of which the following is a specification, reference being had therein to the accompanying drawings.

The invention relates to axle and wheel constructions of the non-floating type, in which the load is carried into the wheel through the rotating axle shaft. It is the object of the invention to obtain a simple construction of connection between the axle and a disk wheel, and the invention has further reference to other specific features as hereinafter set forth.

In the drawings:

Figure 1 is a section through the wheel and axle in the longitudinal plane of the latter;

Figure 2 is a sectional side elevation thereof.

A is the revolving shaft of an axle of the non-floating type. B is a disk wheel for mounting upon said axle, and C is the tire engaging rim secured to the periphery of the disk.

To detachably secure the disk to the axle the latter is formed with an end flange D having an offset E therein forming a recess concentric with the axis. The disk B is of dished form but is provided with a central portion F which is parallel to the plane of rotation and which is provided with the laterally extending flange G for engaging the recess E. H are studs secured to the outer portion of the flange D beyond the offset therein, said studs passing through registering apertures in the portion F of the disk. I is an annular clamping flange of channel cross-section, the sides of the channel being respectively inside and outside of the studs H and bearing against the portion F of the disk. J are nuts engaging the studs H and provided with inwardly-extending sleeve portions K surrounding the studs and slidably engaging apertures in the clamping flange I. The inner ends of these sleeves are flanged or offset at L to prevent their withdrawal from engagement with the clamping ring.

With the construction as thus far described the disk wheel may be readily engaged with or disengaged from the shaft A, the flange G forming a pilot for centering the disk in relation to the axle and also carrying the load into the wheel without shearing stress upon the studs. The clamping flange I secures the disk to the flange D and the sleeves K permit the successive screwing on and screwing off of the nuts while at the same time retaining these nuts in permanent engagement with the clamping flange.

To provide a brake drum for the wheel, which also forms a reinforcement for the rim, provides a construction in which M is the cylinder or drum portion, N is the radially outwardly-extending flange at the inner end of said drum, and P is a radially outwardly-extending flange at the outer end of said drum. The flange P lies adjacent to a portion Q of the disk which is in a parallel plane, and the rim R is provided with a flange R' extending between the flanges P and Q. There is also a detachable rim section S which has a radially inwardly extending flange T parallel to the portion Q on the outer side thereof. U are clamping bolts passing through all of these parallel flanges and V are nuts for engaging said bolts.

With the construction thus described the channel section of the brake drum formed by the outwardly-extending flanges N and P will produce a strong shape which greatly assists in reinforcing the rim.

By turning the dished disk so that its peripheral portion extends axially inward, the load is carried into the shaft at a point close to the central plane of the wheel so as to limit the bending stress.

What I claim as my invention is:

1. The combination with a revoluble axle shaft, of a flange extending radially outward from the end of said shaft and recessed concentric with the axis, a disk wheel having an inwardly turned flange engaging the recess in said axle flange, and means for clamping said disk to said axle flange.

2. The combination with a revoluble axle shaft, of a flange extending radially outward from the end thereof and recessed concentric with the axis, a disk wheel having a portion parallel to the plane of said axle flange with an inturned flange engaging the recess in said axle flange, said disk being dished with its peripheral portion extending inward longitudinally of the axle.

3. The combination with a revoluble axle shaft, of a flange extending radially outward from the end of said shaft, and a dished disk having its inner portion secured to said axle flange and its peripheral portion extending inward axially of the shaft.

4. The combination with a dished disk, of a tire engaging rim having a radially inwardly-extending flange parallel and secured to the peripheral portion of said disk, and a brake drum having a flange parallel to said rim flange and securing portion of the disk clamped thereto, and constituting a reinforcement for the rim.

5. The combination with a wheel rim and a disk wheel body carrying said rim, of a brake drum secured both to said wheel body and rim and reinforcing the same.

6. The combination with a rim having a radially inwardly extending flange, of a brake drum having a radially outwardly extending flange, and a disk wheel body having its peripheral portion clamped to said flanges.

In testimony whereof I affix my signature.

ALDEN L. PUTNAM.